United States Patent
Li et al.

(10) Patent No.: US 10,938,610 B2
(45) Date of Patent: Mar. 2, 2021

(54) METHOD FOR TRANSMITTING PHASE NOISE COMPENSATION REFERENCE SIGNAL, TRANSMISSION DEVICE AND RECEPTION DEVICE

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Xin Su, Beijing (CN); Runhua Chen, Beijing (CN); Rakesh Tamrakar, Beijing (CN); Qiuping Huang, Beijing (CN); Chuanjun Li, Beijing (CN); Mengjun Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/331,934

(22) PCT Filed: Jul. 24, 2017

(86) PCT No.: PCT/CN2017/094144
§ 371 (c)(1),
(2) Date: Mar. 8, 2019

(87) PCT Pub. No.: WO2018/059094
PCT Pub. Date: Apr. 5, 2018

(65) Prior Publication Data
US 2019/0245728 A1      Aug. 8, 2019

(30) Foreign Application Priority Data
Sep. 30, 2016   (CN) .......................... 201610873373.9

(51) Int. Cl.
*H04L 27/26*    (2006.01)
*H04L 1/00*     (2006.01)
(Continued)

(52) U.S. Cl.
CPC ........ *H04L 27/2613* (2013.01); *H04L 1/0003* (2013.01); *H04L 1/0009* (2013.01);
(Continued)

(58) Field of Classification Search
CPC . H04L 27/2613; H04L 1/0003; H04L 1/0009; H04L 5/0048; H04L 25/03821; H04L 27/2646; H04L 27/2691
(Continued)

(56) References Cited

U.S. PATENT DOCUMENTS

| 7,035,324 B2 | 4/2006 | Mar et al. |
| 8,374,358 B2 | 2/2013 | Buck et al. |

(Continued)

FOREIGN PATENT DOCUMENTS

| CN | 102957654 A | 3/2013 |
| CN | 104980220 A | 10/2015 |

(Continued)

OTHER PUBLICATIONS

First Office Action and Search Report from TW app. No. 106125424, dated Jun. 6, 2018, with machine English translation.
(Continued)

*Primary Examiner* — Wednel Cadeau
(74) *Attorney, Agent, or Firm* — Ladas & Parry, LLP

(57) ABSTRACT

A method for transmitting a phase noise compensation reference signal, a transmission device and a reception device are provided. The method includes: determining one or more configurations from N configurations for a transmission resource of the phase noise compensation reference signal; and transmitting the phase noise compensation ref-
(Continued)

erence signal according to the one or more configurations. The N configurations have different time-domain densities or different frequency-domain densities, or a plurality of configurations of the N configurations has a same time-domain density and a same frequency-domain density, where N is an integer greater than or equal to 2.

15 Claims, 4 Drawing Sheets

(51) Int. Cl.
    *H04L 5/00*          (2006.01)
    *H04L 25/03*        (2006.01)

(52) U.S. Cl.
    CPC ...... *H04L 5/0048* (2013.01); *H04L 25/03821* (2013.01); *H04L 27/2646* (2013.01); *H04L 27/2691* (2013.01)

(58) Field of Classification Search
    USPC .......................................................... 375/285
    See application file for complete search history.

(56) References Cited

U.S. PATENT DOCUMENTS

| | | | |
|---|---|---|---|
| 2010/0014481 A1 | 1/2010 | Ko et al. | |
| 2011/0111781 A1 | 5/2011 | Chen et al. | |
| 2014/0198865 A1 | 7/2014 | Pietsch et al. | |
| 2015/0280954 A1 | 10/2015 | Zhao et al. | |
| 2017/0294926 A1* | 10/2017 | Islam | H04W 72/042 |
| 2018/0041321 A1* | 2/2018 | Guo | H04L 5/0048 |
| 2020/0008228 A1 | 1/2020 | Lee et al. | |

FOREIGN PATENT DOCUMENTS

| | | |
|---|---|---|
| CN | 105721379 A | 6/2016 |
| EP | 1443640 A1 | 4/2004 |
| JP | 2019537856 A | 12/2019 |
| WO | 2014003598 A1 | 1/2014 |
| WO | 2014024502 A1 | 2/2014 |

OTHER PUBLICATIONS

Written Opinion of the International Searching Authority from PCT/CN2017/094144, dated Sep. 29, 2017, with English translation from WIPO.
International Preliminary Report on Patentability from PCT/CN2017/094144, dated Apr. 2, 2019, with English translation from WIPO.
International Search Report for PCT /CN2017/094144 dated Sep. 29, 2017 and its English translation provided by WIPO.
Written Opinion of the International Searching Authority for PCT /CN2017/094144 dated Sep. 29, 2017 and its English translation provided by Google Translate.
"DMRS Design Issues in NR", R1-166907, 3GPP TSG RAN WG1 Meeting #86, Gothenburg, Sweden, Aug. 22-26, 2016.
"On DL PTRS design", R1-1708707, 3GPP TSG-RAN WG1 #89, Hangzhou, China, May 15-19, 2017.
Notice of Reasons for Refusal from JP app. No. 2019-516449, dated Jun. 30, 2020, with English translation from Global Dossier.
Notification of Reason for Refusal from KR app. No. 10-2019-7011841, dated Jun. 1, 2020, with English translation from Global Dossier.
Extended European Search Report from EP app. No. 17854548.9, dated Sep. 18, 2019.
"Phase Noise Measurement/Modeling and LLS for High Frequency Numerology", R1-167106, 3GPP TSG RAN WG1 Meeting #86bis, Göteborg, Sweden, Aug. 22-26, 2016.
"Discussion on reference signal design", R1-167204, 3GPP TSG RAN WG1 Meeting #86, Göteborg, Sweden, Aug. 22-26, 2016.
"Study of phase noise tracking", R1-167888, 3GPP TSG RAN WG1 Meeting #86, Göteborg, Sweden, Aug. 22-26, 2016.

* cited by examiner

METHOD FOR TRANSMITTING PHASE NOISE COMPENSATION REFERENCE SIGNAL, TRANSMISSION DEVICE AND RECEPTION DEVICE

CROSS-REFERENCE TO RELATED APPLICATIONS

The present application is the U.S. national phase of PCT Application No. PCT/CN2017/094144 filed on Jul. 24, 2017, which claims a priority of to the Chinese patent application No. 201610873373.9 filed on Sep. 30, 2016, the disclosures of which are incorporated herein by reference in their entireties.

TECHNICAL FIELD

The present disclosure relates to the field of communication technology, in particular to a method for transmitting a phase noise compensation reference signal, a transmission device and a reception device.

BACKGROUND

Phase noise is generated by local oscillators of a transmitter and a receiver, and it may exert an adverse effect on the transmission of multi-carrier signals. Especially, at a high frequency band (more than 6 GHz), the transmission of the multi-carrier signals is adversely affected in a more serious manner, and it is necessary to preform phase noise compensation on a received signal so as to ensure the system performance. A phase noise compensation reference signal is introduced at a transmitting end, so as to enable a receiving end to perform phase noise estimation on a link and compensate for the received signal.

There is no scheme for transmitting the phase noise compensation reference signal for a system operating at a low frequency band, and the scheme for transmitting the phase noise compensation reference signal for a system operating at a high frequency band is relatively complex.

SUMMARY

An object of the present disclosure is to provide a method for transmitting a phase noise compensation reference signal, a transmission device and a reception device, so as to compensate for a Common Phase Error (CPE) and Inter-Carrier Interference (ICI) caused by a phase noise at a relatively low pilot overhead.

In one aspect, the present disclosure provides in some embodiments a method for transmitting a phase noise compensation reference signal, including: determining one or more configurations from N configurations for a transmission resource of the phase noise compensation reference signal; and transmitting the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, the determining the one or more configurations from the N configurations for the transmission resource of the phase noise compensation reference signal includes: determining a first configuration and a second configuration from the N configurations for the transmission resource of the phase noise compensation reference signal.

In a possible embodiment of the present disclosure, a first phase noise compensation reference signal is transmitted according to a first configuration of K1 subcarriers on first Orthogonal Frequency Division Multiplexing (OFDM) symbols included in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M. A second phase noise compensation reference signal is transmitted according to a second configuration of K2 subcarriers on a plurality of second OFDM symbols, wherein the second OFDM symbols are included in the N1 consecutive OFDM symbols within the subframe and other than the first OFDM symbols, where K1 and K2 are each a positive integer greater than or equal to 1, and K1>K2.

In a possible embodiment of the present disclosure, the determining the one or more configurations from the N configurations for the transmission resource of the phase noise compensation reference signal includes: determining a level of a Modulation and Coding Scheme (MCS) for data transmission; and determining the one or more configurations from the N configurations for the transmission resource of the phase noise compensation reference signal in accordance with the level of the MCS.

In a possible embodiment of the present disclosure, the determining the one or more configurations from the N configurations for the transmission resource of the phase noise compensation reference signal in accordance with the level of the MCS includes: determining the one or more configurations from a predetermined corresponding relation between levels of the MCS and transmission densities of the phase noise compensation reference signal in a system in accordance with the level of the MCS.

In a possible embodiment of the present disclosure, the method further includes: transmitting MCS indication information, information of transmission densities of the phase noise compensation reference signal, and transmission data to a reception device, wherein the MCS indication information carries a MCS index.

In a possible embodiment of the present disclosure, the MCS index indicates a corresponding relation among the MCS index, modulation orders, and indication information of data block sizes.

In a possible embodiment of the present disclosure, the method further includes: transmitting MCS indication information and transmission data to a reception device, wherein the MCS indication information carries a MCS index.

In a possible embodiment of the present disclosure, the MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in the system. The corresponding relations are stored in a transmission device and a reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

In another aspect, the present disclosure provides in some embodiments a transmission device, including: a determination module configured to determine one or more configurations from N configurations for a transmission resource of a phase noise compensation reference signal; and a transmission module configured to transmit the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, the determination module is further configured to determine a first configuration and a second configuration from the N configurations for the transmission resource of the phase noise compensation reference signal.

In a possible embodiment of the present disclosure, the transmission module is further configured to: transmit a first phase noise compensation reference signal according to a first configuration of K1 subcarriers on first OFDM symbols included in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M; and transmit a second phase noise compensation reference signal according to a second configuration of K2 subcarriers on a plurality of second OFDM symbols, wherein the second OFDM symbols are included in the N1 consecutive OFDM symbols within the subframe and other than the first OFDM symbols, where K1 and K2 are each a positive integer greater than or equal to 1, and K1>K2.

In a possible embodiment of the present disclosure, the determination module is further configured to: determine a level of a MCS for data transmission; and determine the one or more configurations from the N configurations for the transmission resource of the phase noise compensation reference signal in accordance with the level of the MCS.

In a possible embodiment of the present disclosure, the determination module is further configured to determine the one or more configurations from a predetermined corresponding relation between levels of the MCS and transmission densities of the phase noise compensation reference signal in a system in accordance with the level of the MCS.

In a possible embodiment of the present disclosure, the transmission module is further configured to transmit MCS indication information, information of transmission densities of the phase noise compensation reference signal, and transmission data to a reception device, wherein the MCS indication information carries a MCS index.

In a possible embodiment of the present disclosure, the MCS index indicates a corresponding relation among the MCS index, modulation orders, and indication information of data block sizes.

In a possible embodiment of the present disclosure, the transmission module is further configured to transmit MCS indication information and transmission data to a reception device, wherein the MCS indication information carries a MCS index.

In a possible embodiment of the present disclosure, the MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in the system. The corresponding relations are stored in a transmission device and a reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

In yet another aspect, the present disclosure provides in some embodiments a method for transmitting a phase noise compensation reference signal, including: acquiring one or more configurations determined from N configurations for a transmission resource of the phase noise compensation reference signal; and receiving the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, a first phase noise compensation reference signal is received according to a first configuration of K1 subcarriers on first OFDM symbols included in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M. A second phase noise compensation reference signal is received according to a second configuration of K2 subcarriers on a plurality of second OFDM symbols, wherein the second OFDM symbols are included in the N1 consecutive OFDM symbols within the subframe and other than the first OFDM symbols, where K1 and K2 are each a positive integer greater than or equal to 1, and K1>K2.

In a possible embodiment of the present disclosure, the method further include: receiving transmission data transmitted from a transmission device; and performing inter-subcarrier interference compensation on the transmission data in an OFDM symbol in accordance with the phase noise compensation reference signal, and/or performing OFDM symbol phase difference compensation on the transmission data in accordance with the phase noise compensation reference signal.

In a possible embodiment of the present disclosure, the method further includes: receiving MCS indication information and information of transmission densities of the phase noise compensation reference signal transmitted from the transmission device, wherein the MCS indication information carries a MCS index.

In a possible embodiment of the present disclosure, the MCS index indicates a corresponding relation among the MCS index, modulation orders, and indication information of data block sizes.

In a possible embodiment of the present disclosure, the method further includes: receiving MCS indication information transmitted from the transmission device, wherein the MCS indication information carries a MCS index.

In a possible embodiment of the present disclosure, the MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in a system. The corresponding relations are stored in a transmission device and a reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

In still yet another aspect, the present disclosure provides in some embodiments a reception device, including: an acquisition module configured to acquire one or more configurations determined from N configurations for a transmission resource of a phase noise compensation reference signal; and a reception module configured to receive the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, the reception module is further configured to: receive a first phase noise compensation reference signal according to a first configuration of K1 subcarriers on first OFDM symbols included in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M; and receive a second phase noise compensation reference signal according to a second configuration of K2 subcarriers on a plurality of second OFDM symbols, wherein the second OFDM symbols are included in the N1 consecutive OFDM symbols within the subframe and other than the first OFDM symbols, where K1 and K2 are each a positive integer greater than or equal to 1, and K1>K2.

In a possible embodiment of the present disclosure, the reception module is further configured to: receive transmission data transmitted from a transmission device; and perform inter-subcarrier interference compensation on the transmission data in an OFDM symbol in accordance with the phase noise compensation reference signal, and/or performing OFDM symbol phase difference compensation on the transmission data in accordance with the phase noise compensation reference signal.

In a possible embodiment of the present disclosure, the reception module is further configured to receive MCS indication information and information of transmission densities of the phase noise compensation reference signal transmitted from the transmission device, wherein the MCS indication information carries a MCS index.

In a possible embodiment of the present disclosure, the MCS index indicates a corresponding relation among the MCS index, modulation orders, and indication information of data block sizes.

In a possible embodiment of the present disclosure, the reception module is further configured to: receive MCS indication information transmitted from the transmission device, wherein the MCS indication information carries a MCS index.

In a possible embodiment of the present disclosure, the MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in a system. The corresponding relations are stored in a transmission device and a reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

In still yet another aspect, the present disclosure provides in some embodiments a transmission device, including a processor, a memory and a transceiver. The processor is configured to read a program stored in the memory, so as to: determine one or more configurations from N configurations for a transmission resource of a phase noise compensation reference signal; and transmit the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2. The transceiver is configured to receive and transmit data. The memory is configured to store therein data for the operation of the processor.

In still yet another aspect, the present disclosure provides in some embodiments a reception device, including a processor, a memory and a transceiver. The processor is configured to read a program stored in the memory, so as to: acquire one or more configurations determined from N configurations for a transmission resource of the phase noise compensation reference signal; and receive the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2. The transceiver is configured to receive and transmit data. The memory is configured to store therein data for the operation of the processor.

According to the embodiments of the present disclosure, the one or more configurations are determined from the N configurations for the transmission resource of the phase noise compensation reference signal, and then the phase noise compensation reference signal is transmitted according to the one or more configurations. The N configurations have different time-domain densities or different frequency-domain densities. As a result, it is able to compensate for the CPE and ICI caused by a phase noise at a relatively low pilot overhead.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

The present disclosure will be described in more details hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure, and convey the scope of the present disclosure completely to a person skilled in the art.

An object of the present disclosure is to provide a scheme for transmitting a phase noise compensation reference signal, so as to compensate for a CPE (i.e., a phase difference between OFDM symbols) and an ICI (i.e., an inter-subcarrier interference in one OFDM symbol caused by a phase noise) caused by a phase noise at a relatively low pilot overhead.

Figure 1:
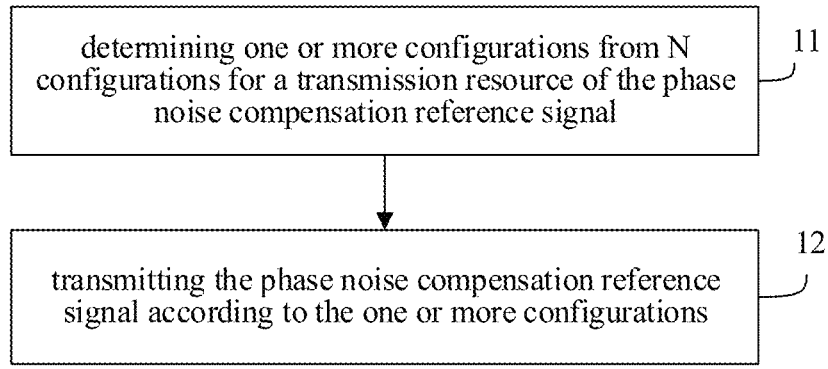
FIG. 1 is a flow chart of a method for transmitting a phase noise compensation reference signal according to some embodiments of the present disclosure.

The present disclosure provides in some embodiments a method for transmitting a phase noise compensation reference signal which, as shown in FIG. 1, includes: Step 11 of determining one or more configurations from N configurations for a transmission resource of the phase noise compensation reference signal; and Step 12 of transmitting the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

According to the embodiments of the present disclosure, the one or more configurations are determined from the N configurations for the transmission resource of the phase noise compensation reference signal, and then the phase noise compensation reference signal is transmitted according to the one or more configurations. As a result, it enables the phase noise compensation reference signal to compensate for the CPE and ICI caused by a phase noise.

Figure 2:
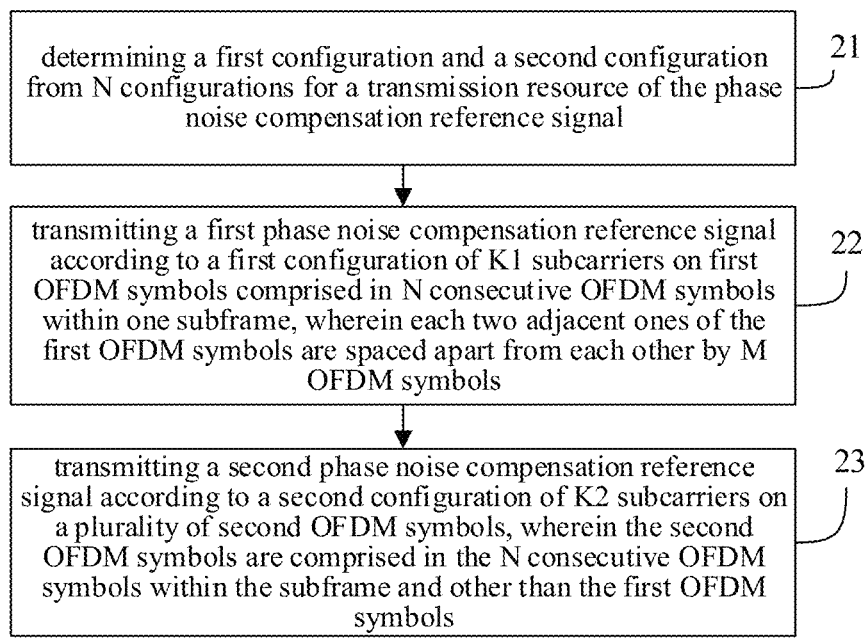
FIG. 2 is another flow chart of the method for transmitting the phase noise compensation reference signal according to some embodiments of the present disclosure.

The present disclosure further provides in some embodiments a method for transmitting a phase noise compensation reference signal which, as shown in FIG. 2, includes the following steps.

Step 21: determining a first configuration and a second configuration from N configurations for a transmission resource of the phase noise compensation reference signal. To be specific, the determined first configuration may adopt K1 subcarriers, and the determined second configuration may adopt K2 subcarriers.

Step 22: transmitting a first phase noise compensation reference signal according to a first configuration of K1 subcarriers on first OFDM symbols comprised in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M.

Step 23: transmitting a second phase noise compensation reference signal according to a second configuration of K2 subcarriers on a plurality of second OFDM symbols, wherein the second OFDM symbols are comprised in the N1 consecutive OFDM symbols within the subframe and other than the first OFDM symbols, where K1 and K2 are each a positive integer greater than or equal to 1, and K1>K2, and K2≥1.

Figure 3:
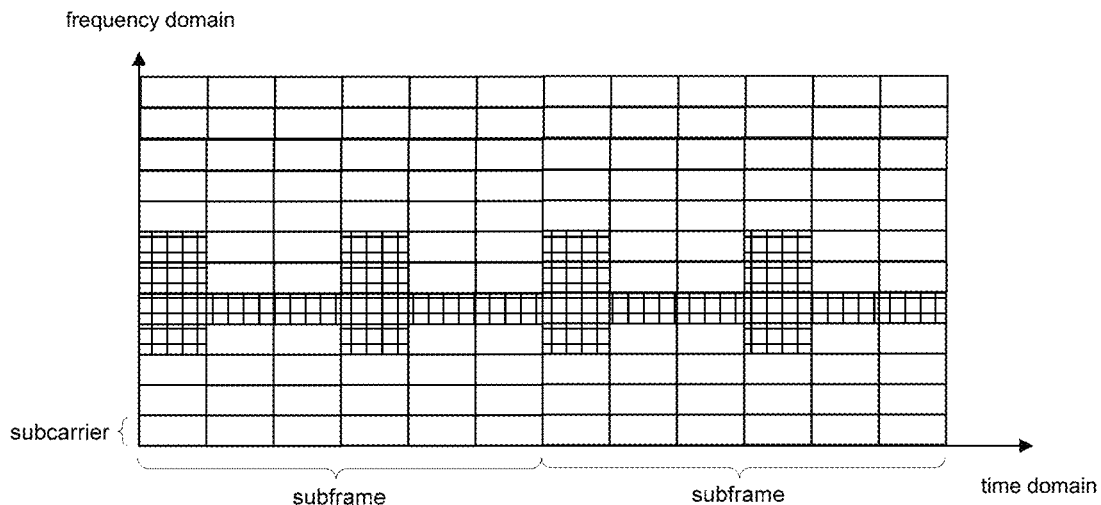
FIG. 3 is a schematic view showing a transmission pattern of the phase noise compensation reference signal in the embodiment described with reference to FIG. 2.

To be specific, as shown in FIG. 3, N=6, M=2, K1=4, K2=1, and the hatched portion represents a time-frequency position of the phase noise compensation reference signal.

Through such a time-frequency pattern for the transmission of the phase noise compensation reference signal, it is able to ensure the estimation of the CPE and ICI in an OFDM symbols including K1 subcarriers.

In addition, merely the estimation of the CPE may be performed in an OFDM symbol including K2 subcarriers, and the ICI estimated in the previous OFDM symbol may be adopted for the ICI compensation in this OFDM symbol.

Figure 4:
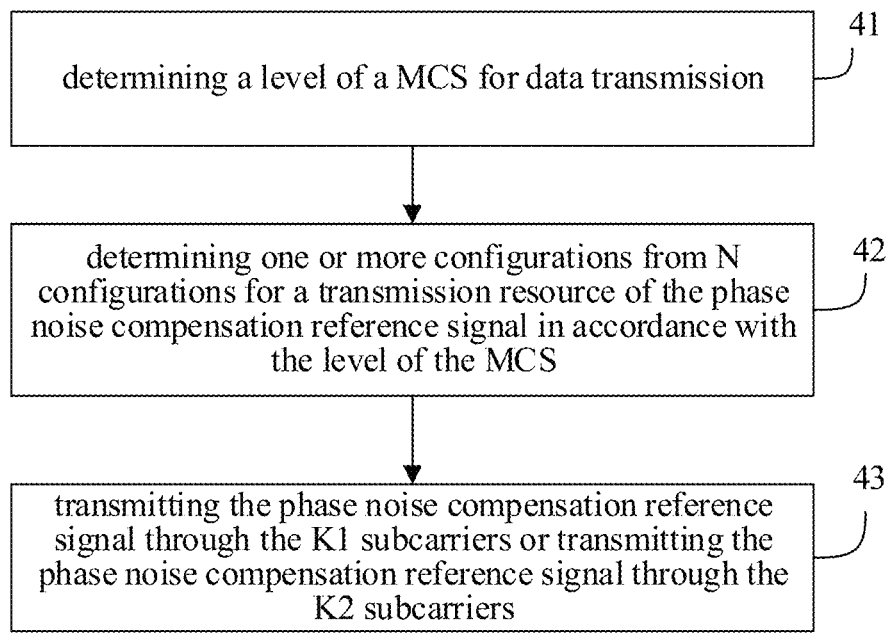
FIG. 4 is yet another flow chart of the method for transmitting the phase noise compensation reference signal according to some embodiments of the present disclosure.

The present disclosure further provides in some embodiments a method for transmitting a phase noise compensation reference signal which, as shown in FIG. 4, includes the following steps.

Step 41: determining a level of a MCS for data transmission.

Step 42: determining one or more configurations from N configurations for a transmission resource of the phase noise compensation reference signal in accordance with the level of the MCS.

To be specific, the one or more configurations may be determined from a predetermined corresponding relation between levels of the MCS and transmission densities of the phase noise compensation reference signal in a system in accordance with the level of the MCS.

For example, a first configuration in the configurations for the phase noise compensation reference signal may be determined to correspond to K1 subcarriers, or a second configuration in the configurations for the phase noise compensation reference signal may be determined to correspond to K2 subcarriers.

Step 43: transmitting the phase noise compensation reference signal through the K1 subcarriers or transmitting the phase noise compensation reference signal through the K2 subcarriers, K1 and K2 being each a positive integer.

Based on the above Steps 41-43, the method may further include Step 44 of transmitting MCS indication information carrying a MCS index, information of transmission density of the phase noise compensation reference signal and transmission data to a reception device. The MCS index may indicate a corresponding relation among a MCS index, modulation orders, and indication information of data block sizes.

Based on the above Steps 41-43, the method may further include: Step 45 of transmitting MCS indication information carrying a MCS index and transmission data to a reception device. The MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in the system. The corresponding relations may be stored in a transmission device and a reception device.

In a possible embodiment of the present disclosure, for transmission densities of at least two phase noise compensation reference signals, they may have a same time-domain density and different frequency-domain densities, or have different time-domain densities and different frequency-domain densities, or have different time-domain densities and a same frequency-domain density, or have a same time-domain density and a same frequency-domain density.

The implementation of the method in the embodiment described with reference to in FIG. 4 will be described as follows.

(1) The phase noise compensation reference signals having different transmission densities and corresponding to different configurations may be pre-agreed in the system, and each phase noise compensation reference signal having a certain transmission density may have a fixed time-frequency pattern. The phase noise compensation reference signals having different transmission densities may have a same time-domain density and different frequency-domain densities, or have different time-domain densities and different frequency-domain densities, or have a same frequency-domain density and different time-domain densities.

(2) The transmission device may determine the MCS for the data transmission, and determine the phase noise compensation reference signal at a certain density to be transmitted in accordance with the MCS (optionally as well as a subcarrier interval of the system).

(3) A transmitting end may transmit the data and the transmission density of the phase noise compensation reference signal determined in the above step, and notify a receiving end of the MCS indication information (not including the indication information of the density of the phase noise compensation reference signal) and the indication information of the density of the phase noise compensation reference signal through a control channel or high-layer signaling.

(4) The reception device may receive the transmission data, receive the MCS indication information and the indication information of the density of the phase noise compensation reference signal notified through the control channel or high-layer signaling, receive the phase noise compensation reference signal on a corresponding time-frequency resource in accordance with the indication information of the density of the phase noise compensation reference signal, and perform the subsequent data compensation.

In a possible embodiment of the present disclosure, the above (3) and (4) may also be implemented as follows.

(3a) The MCS indication information may include the indication information of the density of the phase noise compensation reference signal, and the transmitting end may merely notify the receiving end of the MCS indication information.

(4a) The reception device may receive the data, receive the MCS indication information notified through the control channel or high-layer signaling, receive the phase noise compensation reference signal on a corresponding time-frequency resource in accordance with the MCS indication information and the indication information of the density of the phase noise compensation reference signal pre-agreed in the system and corresponding to the MCS indication information, and perform the subsequent data compensation.

In another possible embodiment of the present disclosure, the above (3) and (4) may also be implemented as follows.

(3b) The MCS indication information may not include the indication information of the density of the phase noise compensation reference signal. The corresponding relation between the densities of the phase noise compensation reference signal and the MCS indication information (optionally as well as a subcarrier interval) may be pre-agreed in the system, and stored in the transmission device and the reception device. The transmission device may merely notify the reception device of the MCS indication information rather than the indication information of the density of the phase noise compensation reference signal.

(4b) The reception device may receive the data, receive the MCS indication information notified through the control channel or high-layer signaling, receive the phase noise compensation reference signal on a corresponding time-frequency resource in accordance with the MCS indication information and the corresponding relation between the MCS indication information and the densities of the phase noise compensation reference signal pre-agreed in the system and stored in the reception device, and perform the subsequent data compensation.

First Example

Figure 5:
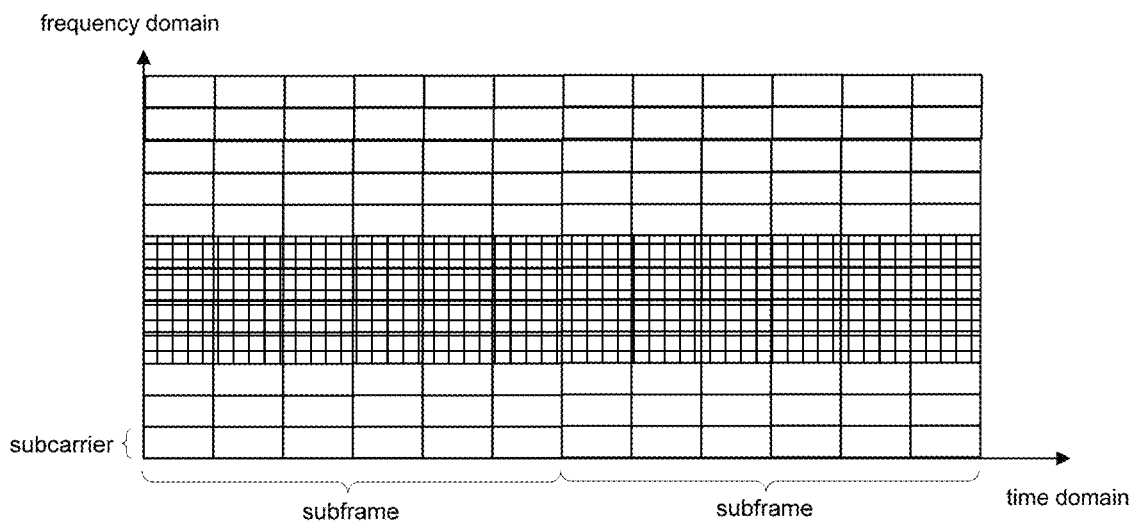
FIG. 5 is a schematic view showing a transmission pattern 1 of the phase noise compensation reference signal in the embodiment described with reference to FIG. 4.

1) Two configurations for the transmission resource of the phase noise compensation reference signal have been defined in the system. Configuration 1 may correspond to a high-density phase noise compensation reference signal having a pattern in FIG. 5, i.e., for each OFDM symbol where the phase noise compensation reference signal exists, the phase noise compensation reference signal may be transmitted on four adjacent subcarriers, so as to compensate for both the CPE and the ICI. Configuration 2 may correspond to a low-density phase noise compensation reference signal having a pattern in FIG. 6, i.e., for each OFDM symbol where the phase noise compensation reference signal exists, the phase noise compensation reference signal may be transmitted on one subcarrier, so as to merely compensate for the CPE.

It assumes that Table 1 shows the definition of the MCS indication information in the system. The MCS indication information may include I MCS levels, and each MCS level may include information of a modulation order and a data block indicator representing one of S data block sizes. In addition, Table 2 shows a corresponding relation between the densities of the phase noise compensation reference signal and the MCS indication information.

In a possible embodiment of the present disclosure, the lower the MCS level, the lower the modulation order and the coding rate. At this time, merely the CPE compensation may be performed through the low-density phase noise compensation reference signal.

TABLE 1 definition of MCS indication information

| MCS index | Modulation order | Data block indicator |
|---|---|---|
| 0 | 2 | 0 |
| 1 | 2 | 1 |
| 2 | 2 | 2 |
| . . . | . . . | . . . |
| I-2 | 4 | S-2 |
| I-1 | 6 | S-1 |

TABLE 2 corresponding relation between densities of phase noise compensation reference signal and MCS indication information

| MCS index | density of phase noise compensation reference signal |
|---|---|
| 0 | Low |
| 1 | Low |
| 2 | Low |
| . . . | . . . |
| I-2 | High |
| I-1 | High |

2) The transmission device may determine the modulation order as 2 and the data block indicator as 2 in accordance with a feedback message from the reception device, and determine that the low-density phase noise compensation reference signal is to be transmitted in accordance with a mapping relationship in Table 2.

Figure 6:
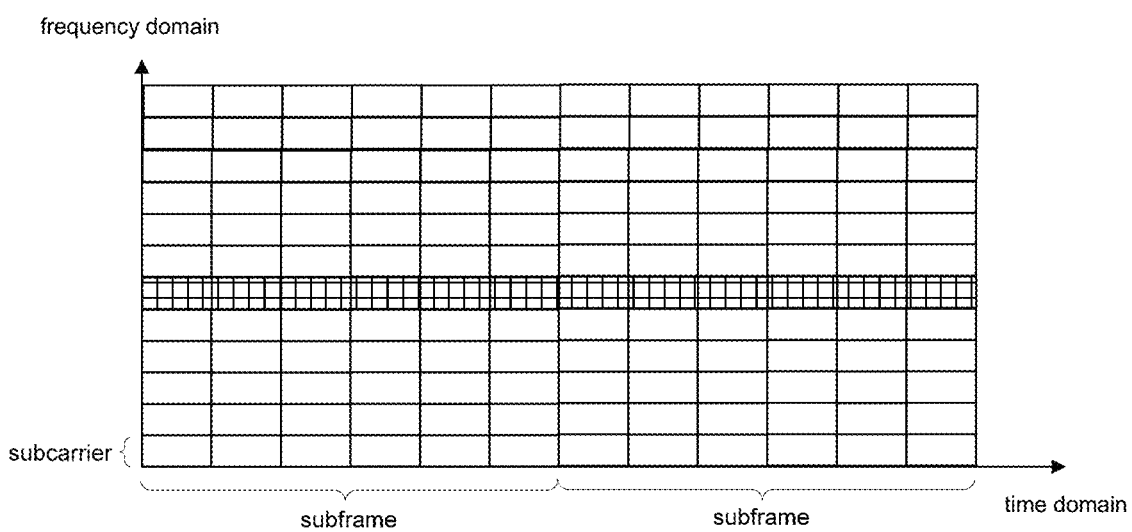
FIG. 6 is a schematic view showing a transmission pattern 2 of the phase noise compensation reference signal in the embodiment described with reference to FIG. 4.

3) The transmission device may transmit the data and the phase noise compensation reference signal in FIG. 6, and notify the receiving end of MCS index=2 through the control channel.

4) The reception device may receive the MCS index notified through the control channel, receive the data, determine a time-frequency pattern of the phase noise compensation reference signal in FIG. 6 in accordance with the mapping relationship in Table 2, and estimate a phase noise.

Second Example

1) It assumes that two configurations for the transmission resource of the phase noise compensation reference signal have been defined in the system. Configuration 1 may correspond to a high-density phase noise compensation reference signal having a pattern in FIG. 5. Configuration 2 may correspond to a low-density phase noise compensation reference signal having a pattern in FIG. 6.

In addition, the MCS indication information adopted in the system may include the modulation order, the data block indicator and the density of the phase noise compensation reference signal defined in Table 3.

For example, when MCS index=I-2, it means that the data has a modulation order of 4 and a data block size indicated by the data block indicator S-2, and the high-density phase noise compensation reference signal is to be transmitted.

TABLE 3 definition of MCS indication information

| MCS index | Modulation order | Data block indicator | Density of phase noise compensation reference signal |
|---|---|---|---|
| 0 | 2 | 0 | Low |
| 1 | 2 | 1 | Low |
| 2 | 2 | 2 | Low |
| . . . | . . . | . . . | . . . |
| I-2 | 4 | S-2 | High |
| I-1 | 6 | S-1 | High |

2) The transmission device may determine the modulation order as 2 and the data block size indicator as 1 in accordance with a feedback message from the reception end, and determine that the low-density phase noise compensation reference signal is to be transmitted.

3) The transmission device may transmit the data and the phase noise compensation reference signal in FIG. 6, and notify the receiving end of MCS index=1 through the control channel.

4) The reception device may receive the MCS index notified through the control channel, receive the data, determine a time-frequency pattern of the phase noise compensation reference signal in FIG. 6 in accordance with the definition in Table 3, and estimate a phase noise.

According to the embodiments of the present disclosure, it is able to compensate for the CPE and the ICI caused by the phase noise at a relatively low pilot overhead.

Figure 7:
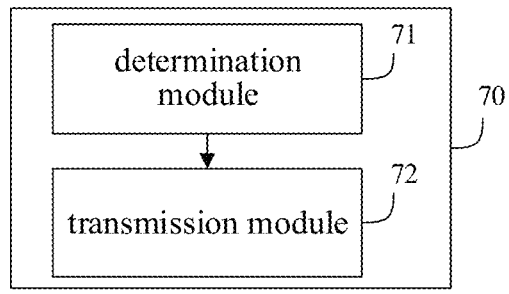
FIG. 7 is a block diagram of a transmission device according to some embodiments of the present disclosure.

The present disclosure further provides in some embodiments a transmission device 70 which, as shown in FIG. 7, includes: a determination module 71 configured to determine one or more configurations from N configurations for a transmission resource of a phase noise compensation reference signal; and a transmission module 72 configured to transmit the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, the determination module 71 is further configured to determine a first configuration and a second configuration from the N configurations for the transmission resource of the phase noise compensation reference signal.

In a possible embodiment of the present disclosure, the transmission module 72 is further configured to: transmit a first phase noise compensation reference signal according to a first configuration of K1 subcarriers on first OFDM symbols comprised in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M; and transmit a second phase noise compensation reference signal according to a second configuration of K2 subcarriers on a plurality of second OFDM symbols, wherein the second OFDM symbols are comprised in the N1 consecutive OFDM symbols within the subframe and other than the first OFDM symbols, where K1 and K2 are each a positive integer, and K1>K2.

In a possible embodiment of the present disclosure, the determination module 71 is further configured to: determine a level of a MCS for data transmission; and determine the one or more configurations from the N configurations for the transmission resource of the phase noise compensation reference signal in accordance with the level of the MCS.

In a possible embodiment of the present disclosure, the determination module 71 is further configured to determine the one or more configurations from a predetermined corresponding relation between levels of the MCS and transmission densities of the phase noise compensation reference signal in a system in accordance with the level of the MCS.

In a possible embodiment of the present disclosure, the transmission module 72 is further configured to transmit MCS indication information, information of transmission densities of the phase noise compensation reference signal, and transmission data to a reception device, wherein the MCS indication information carries a MCS index.

In a possible embodiment of the present disclosure, the MCS index indicates a corresponding relation among the MCS index, modulation orders, and indication information of data block sizes.

In a possible embodiment of the present disclosure, the transmission module 72 is further configured to transmit MCS indication information and transmission data to a reception device, wherein the MCS indication information carries a MCS index.

In a possible embodiment of the present disclosure, the MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in the system. The corresponding relations are stored in the transmission device and the reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

The device embodiment with reference to FIG. 7 may correspond to the method embodiment with reference to FIGS. 1-4, and the implementation of the device may refer to that of the method mentioned hereinabove, with a same technical effect.

The present disclosure further provides in some embodiments a transmission device, including: a processor configured to achieve a function of the above-mentioned determination module 71, i.e., determine one or more configurations from N configurations for a transmission resource of a phase noise compensation reference signal, where N being an integer greater than or equal to 2; and a transmitter configured to achieve a function of the above-mentioned transmission module 72, i.e., transmit the phase noise compensation reference signal according to the one or more configurations. The N configurations have different time-domain densities or different frequency-domain densities, or a plurality of configurations of the N configurations has a same time-domain density and a same frequency-domain density.

The transmission device may further include a memory configured to store therein data for the operation of the processor. The processor may be connected to the memory through a bus interface, the processor may be in communication with the transmitter, and the memory may be connected to the transmitter through the bus interface or in communication with the transmitter.

The implementation of the transmission device may refer to that in FIG. 7 mentioned hereinabove, with a same technical effect. In addition, the transmission device may further include any other member or unit related to the processor, memory and the transmitter, e.g., a receiver configured to achieve a function of a reception module. It should be appreciated that the transmitter and the receiver may together be implemented by a transceiver.

Figure 8:
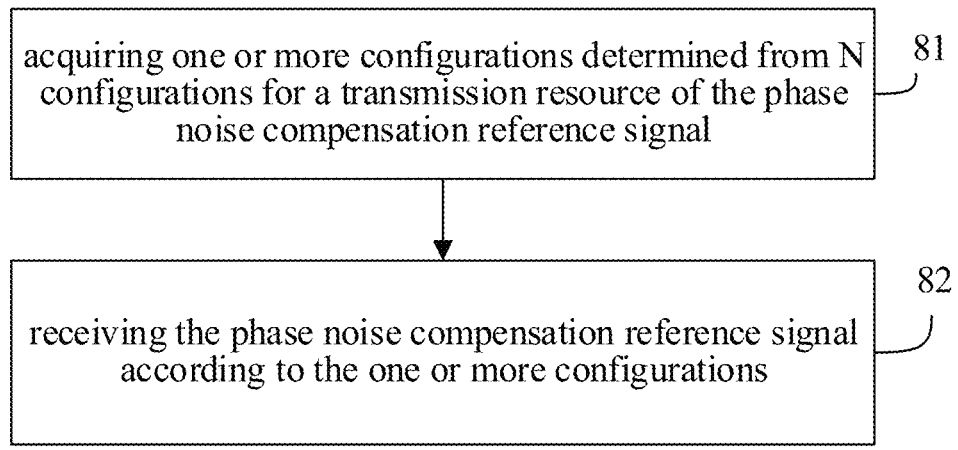
FIG. 8 is a flow chart of a method for transmitting a phase noise compensation reference signal according to some embodiments of the present disclosure.

The present disclosure further provides in some embodiments a method for transmitting a phase noise compensation reference signal which, as shown in FIG. 8, includes: Step 81 of acquiring one or more configurations determined from N configurations for a transmission resource of the phase noise compensation reference signal; and Step 82 of receiving the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

A first implementation of the phase noise compensation reference signal is as follows. A first phase noise compensation reference signal is received according to a first configuration of K1 subcarriers on first OFDM symbols comprised in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M. A second phase noise compensation reference signal is received according to a second configuration of K2 subcarriers on a plurality of second OFDM symbols, wherein the second OFDM symbols are comprised in the N1 consecutive OFDM symbols within the subframe and other than the first OFDM symbols, where K1 and K2 are each a positive integer, and K1>K2.

A second implementation of the phase noise compensation reference signal is as follows. The method may include: Step 811 of acquiring one or more configurations determined from the N configurations for the transmission resource of the phase noise compensation reference signal; Step 812 of receiving the phase noise compensation reference signal according to the one or more configurations, the N configurations having different time-domain densities or different frequency-domain densities, or a plurality of configurations of the N configurations having a same time-domain density and a same frequency-domain density; Step 813 of receiving transmission data transmitted from a transmission device; and Step 814 of performing inter-subcarrier interference compensation on the transmission data in the OFDM symbol in accordance with the phase noise compensation reference signal, and performing OFDM symbol phase difference compensation on the transmission data in accordance with the phase noise compensation reference signal.

Based on the above Steps 811 to 814, the method may further include Step 815 of receiving MCS indication information and information of transmission densities of the phase noise compensation reference signal transmitted from the transmission device, wherein the MCS indication information carries a MCS index. The MCS index may indicate a corresponding relation among the MCS index, modulation orders, and indication information of data block sizes.

Based on the above Steps 811 to 814, the method may further include Step 816 of receiving MCS indication information transmitted from the transmission device, wherein the MCS indication information carries a MCS index. The MCS index indicates a corresponding relation among the MCS index, modulation orders, indication information of data block sizes, and information of transmission densities of the phase noise compensation reference signal; or the MCS index indicates a corresponding relation among the MCS index, the modulation orders, and the indication information of the data block sizes, and a corresponding relation between the MCS index and the information of the transmission densities of the phase noise compensation reference signal is predefined in a system. The corresponding relations are stored in a transmission device and a reception device.

In a possible embodiment of the present disclosure, the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

According to the embodiments of the present disclosure, it is able for the reception device to compensate for the CPE and the ICI caused by the phase noise.

Figure 9:
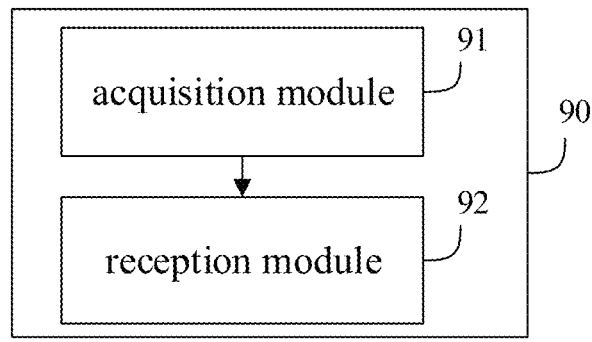
FIG. 9 is a block diagram of a reception device according to some embodiments of the present disclosure.

The present disclosure further provides in some embodiments a reception device 90 which, as shown in FIG. 9, includes: an acquisition module 91 configured to acquire one or more configurations determined from N configurations for a transmission resource of the phase noise compensation reference signal; and a reception module 92 configured to receive the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

In a possible embodiment of the present disclosure, the reception module is further configured to: receive a first phase noise compensation reference signal according to a first configuration of K1 subcarriers on first OFDM symbols comprised in N1 consecutive OFDM symbols within one subframe, wherein each two adjacent ones of the first OFDM symbols are spaced apart from each other by M OFDM symbols, where N1 and M are each a positive integer greater than or equal to 1, and N1≥M; and receive a second phase noise compensation reference signal according to a second configuration of K2 subcarriers on a plurality of second OFDM symbols, wherein the second OFDM symbols are comprised in the N1 consecutive OFDM symbols within the subframe and other than the first OFDM symbols, where K1 and K2 are each a positive integer, and K1>K2.

In a possible embodiment of the present disclosure, the reception module is further configured to: receiving transmission data transmitted from a transmission device; and performing inter-subcarrier interference compensation on the transmission data in an OFDM symbol in accordance with the phase noise compensation reference signal, and/or performing OFDM symbol phase difference compensation on the transmission data in accordance with the phase noise compensation reference signal.

In a possible embodiment of the present disclosure, the reception module is further configured to receive MCS indication information and information of transmission densities of the phase noise compensation reference signal transmitted from the transmission device, wherein the MCS indication information carries a MCS index. The MCS index indicates a corresponding relation among the MCS index, modulation orders, and indication information of data block sizes.

In a possible embodiment of the present disclosure, the reception module is further configured to receive MCS indication information transmitted from the transmission device, wherein the MCS indication information carries a MCS index.

The MCS index may indicate a corresponding relation among the MCS index, modulation orders, indication information of data block sizes, and information of transmission densities of the phase noise compensation reference signal; or the MCS index may indicate a corresponding relation among the MCS index, the modulation orders, and the indication information of the data block sizes, and a corresponding relation between the MCS index and the information of the transmission densities of the phase noise compensation reference signal is predefined in a system. The corresponding relations may be stored in the transmission device and the reception device.

In a possible embodiment of the present disclosure, the N configurations for the transmission resource of the phase noise compensation reference signal may have a same time-domain density and different frequency-domain densities, or have different time-domain densities and different frequency-domain densities, or have different time-domain densities and a same frequency-domain density, or have a same time-domain density and a same frequency-domain density.

The device embodiment with reference to FIG. 9 may correspond to the method embodiment with reference to FIG. 8, and the implementation of the device may refer to that of the method mentioned hereinabove, with a same technical effect.

The present disclosure further provides in some embodiments a transmission device which includes: a processor configured to achieve a function of the above acquisition module 91, i.e., acquire one or more configurations determined from N configurations for a transmission resource of the phase noise compensation reference signal; and a receiver configured to achieve a function of the above reception module 92, i.e., receive the phase noise compensation reference signal according to the one or more configurations. The N configurations have different time-domain densities or different frequency-domain densities, or a plurality of configurations of the N configurations has a same time-domain density and a same frequency-domain density, where N is an integer greater than or equal to 2.

The reception device may further include a memory configured to store therein data for the operation of the processor. The processor may be connected to the memory through a bus interface, the processor may be in communication with the receiver, and the memory may be connected to the transmitter through the bus interface or in communication with the receiver.

The implementation of the transmission device may refer to that in FIG. 9 mentioned hereinabove, with a same technical effect. In addition, the transmission device may further include any other member or unit related to the processor, the memory, the receiver, and the like, e.g., a receiver configured to achieve a function of a reception module. It should be appreciated that the transmitter and the receiver may together be implemented by a transceiver.

According to the embodiments of the present disclosure, it is able to compensate for the CPE and the ICI caused by the phase noise at a relatively low pilot overhead.

The above embodiments are merely optional embodiments of the present disclosure. Obviously, a person skilled in the art may make further modifications and improvements without departing from the principles of the present disclosure, and these modifications and improvements shall also fall within the scope of the present disclosure.

What is claimed is:

1. A method for transmitting a phase noise compensation reference signal, comprising:
    determining one or more configurations from N configurations for a transmission resource of the phase noise compensation reference signal; and
    transmitting the phase noise compensation reference signal according to the one or more configurations,
    wherein the N configurations have different time-domain densities or different frequency-domain densities, or a plurality of configurations of the N configurations has a same time-domain density and a same frequency-domain density, where N is an integer greater than or equal to 2,
    wherein the determining the one or more configurations from the N configurations for the transmission resource of the phase noise compensation reference signal comprises:
    determining a level of a Modulation and Coding Scheme (MCS) for data transmission; and
    determining the one or more configurations from the N configurations for the transmission resource of the phase noise compensation reference signal in accordance with the level of the MCS,
    wherein the method further comprises:
    transmitting MCS indication information and transmission data to a reception device, wherein the MCS indication information carries a MCS index,
    wherein the MCS index indicates a corresponding relation among the MCS index, and modulation orders, and information of transmission densities of the phase noise compensation reference signal; or
    the MCS index indicates a corresponding relation between the MCS index and the modulation orders, and a corresponding relation between the MCS index and the information of the transmission densities of the phase noise compensation reference signal is pre-defined in a system,
    wherein the corresponding relations are stored in a transmission device and a reception device.

2. The method according to claim 1, wherein the determining the one or more configurations from the N configurations for the transmission resource of the phase noise compensation reference signal in accordance with the level of the MCS further comprises:
    determining the one or more configurations from a predetermined corresponding relation between levels of the MCS and the transmission densities of the phase noise compensation reference signal in the system in accordance with the level of the MCS.

3. The method according to claim 1, wherein the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

4. The method according to claim 2, further comprising:
    transmitting MCS indication information, information of transmission densities of the phase noise compensation reference signal, and transmission data to a reception device, wherein the MCS indication information carries a MCS index.

5. The method according to claim 4, wherein the MCS index indicates a corresponding relation among the MCS index, modulation orders, and indication information of data block sizes.

6. A transmission device, comprising a processor, a memory and a transceiver, wherein
    the processor is configured to read a program stored in the memory to execute steps of:
    determining one or more configurations from N configurations for a transmission resource of a phase noise compensation reference signal; and
    transmitting via the transceiver the phase noise compensation reference signal according to the one or more configurations,
    wherein the N configurations have different time-domain densities or different frequency-domain densities, or a plurality of configurations of the N configurations has a same time-domain density and a same frequency-domain density, where N is an integer greater than or equal to 2,
    the transceiver is configured to receive and transmit data, and
    the memory is configured to store therein data for operation of the processor,
    wherein the determining the one or more configurations from the N configurations for the transmission resource of the phase noise compensation reference signal comprises:
    determining a level of a MCS for data transmission; and
    determining the one or more configurations from the N configurations for the transmission resource of the phase noise compensation reference signal in accordance with the level of the MCS,
    wherein the processor is further configured to read the program stored in the memory to execute a step of:
    transmitting MCS indication information and transmission data to a reception device, wherein the MCS indication information carries a MCS index,
    wherein the MCS index indicates a corresponding relation among the MCS index, and modulation orders, and information of transmission densities of the phase noise compensation reference signal; or the MCS index indicates a corresponding relation between the MCS index and the modulation orders, and a corresponding relation between the MCS index and the information of the transmission densities of the phase noise compensation reference signal is predefined in a system, wherein the corresponding relations are stored in a transmission device and a reception device.

7. The transmission device according to claim 6, wherein the determining the one or more configurations from the N configurations for the transmission resource of the phase noise compensation reference signal in accordance with the level of the MCS comprises:

determining the one or more configurations from a predetermined corresponding relation between levels of the MCS and the transmission densities of the phase noise compensation reference signal in the system in accordance with the level of the MCS.

8. The transmission device according to claim 6, wherein the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

9. The transmission device according to claim 7, wherein the processor is further configured to read the program stored in the memory to execute a step of:

transmitting MCS indication information, information of transmission densities of the phase noise compensation reference signal, and transmission data to a reception device, wherein the MCS indication information carries a MCS index.

10. The transmission device according to claim 9, wherein the MCS index indicates a corresponding relation among the MCS index, modulation orders, and indication information of data block sizes.

11. A method for transmitting a phase noise compensation reference signal, comprising:

acquiring one or more configurations determined from N configurations for a transmission resource of the phase noise compensation reference signal; and receiving the phase noise compensation reference signal according to the one or more configurations, wherein the N configurations have different time-domain densities or different frequency-domain densities, or a plurality of configurations of the N configurations has a same time-domain density and a same frequency-domain density, where N is an integer greater than or equal to 2, wherein the one or more configurations is determined from the N configurations for the transmission resource of the phase noise compensation reference signal by:

determining a level of a MCS for data transmission; and determining the one or more configurations from the N configurations for the transmission resource of the phase noise compensation reference signal in accordance with the level of the MCS, wherein the method further comprises: receiving MCS indication information transmitted from the transmission device, wherein the MCS indication information carries a MCS index, wherein the MCS index indicates a corresponding relation among the MCS index, and modulation orders, and information of transmission densities of the phase noise compensation reference signal; or the MCS index indicates a corresponding relation between the MCS index and the modulation orders, and a corresponding relation between the MCS index and the information of the transmission densities of the phase noise compensation reference signal is predefined in a system, wherein the corresponding relations are stored in a transmission device and a reception device.

12. The method according to claim 11, further comprising:

receiving transmission data transmitted from the transmission device; and performing inter-subcarrier interference compensation on the transmission data in an OFDM symbol in accordance with the phase noise compensation reference signal, and/or performing OFDM symbol phase difference compensation on the transmission data in accordance with the phase noise compensation reference signal.

13. The method according to claim 11, wherein the N configurations for the transmission resource of the phase noise compensation reference signal have a same time-domain density and different frequency-domain densities, or have different time-domain densities and different frequency-domain densities, or have different time-domain densities and a same frequency-domain density, or have a same time-domain density and a same frequency-domain density.

14. The method according to claim 12, further comprising:

receiving MCS indication information and information of transmission densities of the phase noise compensation reference signal transmitted from the transmission device, wherein the MCS indication information carries a MCS index.

15. The method according to claim 14, wherein the MCS index indicates a corresponding relation among the MCS index, modulation orders, and indication information of data block sizes.

* * * * *